(12) United States Patent
Schultz (10) Patent No.: US 7,393,046 B2
(45) Date of Patent: *Jul. 1, 2008

(54) REMOVABLE STORAGE MODULE FOR VEHICLE

(75) Inventor: Neil A. Schultz, Milford, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,384

(22) Filed: Dec. 29, 2005

(65) Prior Publication Data

US 2006/0103173 A1    May 18, 2006

Related U.S. Application Data

(63) Continuation-in-part of application No. 10/834,649, filed on Apr. 29, 2004.

(51) Int. Cl.
B60R 7/04 (2006.01)
B60R 7/05 (2006.01)

(52) U.S. Cl. .................. 296/214; 224/311; 296/37.7

(58) Field of Classification Search ............. 296/37.1, 296/37.7, 37.8, 210, 214; 224/309, 311, 224/312
See application file for complete search history.

(56) References Cited

U.S. PATENT DOCUMENTS

| | | | |
|---|---|---|---|
| 2,236,428 A | 3/1941 | Haas | |
| 4,079,987 A | 3/1978 | Bumgardener | |
| 4,180,299 A | 12/1979 | Tolerson | |
| 4,738,481 A | 4/1988 | Watjer et al. | |
| 4,984,137 A * | 1/1991 | Maemura | 362/492 |
| 5,062,559 A * | 11/1991 | Falcoff | 224/311 |
| 5,154,617 A * | 10/1992 | Suman et al. | 439/34 |
| 5,190,153 A * | 3/1993 | Schultz et al. | 206/308.1 |
| 5,213,243 A * | 5/1993 | Landon | 224/277 |
| 5,239,449 A | 8/1993 | Wnuk et al. | |
| 5,310,234 A | 5/1994 | Klein | |
| 5,331,525 A | 7/1994 | Lawassani et al. | |
| 5,590,827 A | 1/1997 | Nimpoeno | |
| 5,653,364 A | 8/1997 | Eskandry | |
| 5,762,246 A | 6/1998 | Drew | |
| 6,019,411 A | 2/2000 | Carter et al. | |
| 6,024,400 A | 2/2000 | Donoughe et al. | |
| 6,065,793 A | 5/2000 | Koshida et al. | |
| D432,490 S * | 10/2000 | Golenz | D12/417 |
| D432,981 S * | 10/2000 | Eskandry | D12/417 |
| 6,216,930 B1 | 4/2001 | Plocher et al. | |
| 6,338,517 B1 | 1/2002 | Canni et al. | |
| D453,728 S * | 2/2002 | Hassett | D12/417 |
| 6,659,529 B2 | 12/2003 | Palmer et al. | |
| 6,669,260 B2 | 12/2003 | Clark et al. | |
| 6,722,719 B1 * | 4/2004 | Sturt | 296/37.8 |
| 6,789,843 B2 * | 9/2004 | De Gaillard | 296/216.07 |

(Continued)

Primary Examiner—D. Glenn Dayoan
Assistant Examiner—Paul A Chenevert
(74) Attorney, Agent, or Firm—Brooks Kushman P.C.

(57) ABSTRACT

A removable storage module assembly configured for securement to the headliner in a passenger compartment of a vehicle. The headliner includes a storage module receiving area formed therein having a securement portion disposed proximate the receiving area. A storage module having a housing, a fastener associated with the housing configured to engage the securement portion and a storage area defined in the housing is removably positioned in the storage module receiving area.

7 Claims, 6 Drawing Sheets

U.S. PATENT DOCUMENTS

| | | | |
|---|---|---|---|
| D512,367 S * | 12/2005 | Eskandry | D12/417 |
| 7,270,370 B2 * | 9/2007 | Rumberger et al. | 296/214 |
| 2002/0163218 A1 | 11/2002 | Stubbings et al. | |
| 2003/0183667 A1 * | 10/2003 | Mantis | 224/312 |
| 2005/0161481 A1 | 7/2005 | Rumberger et al. | |
| 2005/0218169 A1 * | 10/2005 | Lau | 224/312 |

* cited by examiner

REMOVABLE STORAGE MODULE FOR VEHICLE

CROSS-REFERENCE TO RELATED APPLICATIONS

This application is a continuation-in-part of U.S. application Ser. No. 10/834,649, filed Apr. 29, 2004, entitled "REMOVABLE STORAGE MODULE FOR VEHICLE."

BACKGROUND OF THE INVENTION

1. Field of the Invention

The present invention relates to a storage module assembly removably secured to the headliner of a passenger compartment of a vehicle.

2. Background Art

Overhead consoles and storage modules are commonly provided in the headliner of a passenger compartment of a vehicle such as an automobile, boat or airplane. The headliner includes an upper surface mounted to the interior roof structure of the vehicle and a lower surface having an overlay applied thereon. The overhead console is mounted to the lower surface of the headliner to provide additional storage space for items such as sunglasses, garage door openers and compact discs.

One significant limitation of current overhead console assemblies is that the accessory storage modules cannot be removed from the console or headliner. Rather, stored items must be removed from the accessory compartments of the modules to transport the items between the vehicle and another location. It would be advantageous to provide a removable storage module configured for securement on the headliner of the vehicle allowing easy transportation of stored items between locations.

Another storage solution commonly used in automotive vehicles is an accessory pocket mounted to a sun visor. Sun visors are pivotally mounted to a headliner to shield the occupant's vision from light entering through the window or windshield of the vehicle. One problem associated with visor mounted storage solutions is that they are not easily removed from the visor once assembled. Further, the storage solutions may adversely affect the performance of the sun visor in the vehicle. Additionally, the storage solutions are not easily concealable, thereby creating a desirable target for thieves.

It would be advantageous to provide a modular storage solution cooperating with the headliner of a vehicle which is easily removable and transportable to a variety of locations. It would also be advantageous to provide a storage module removably secured to a visor assembly by magnets.

SUMMARY OF THE INVENTION

In accordance with the present invention, a removable storage module and headliner combination for use in a passenger compartment of a vehicle includes a headliner having an upper surface and a lower surface having a storage module receiving area formed therein. One or more securement portions are disposed proximate to the storage module receiving area. A storage module is removably positionable in the storage module receiving area. The removable storage module includes a housing defining a storage area. One or more fasteners associated with the housing engage one or more securement portions in the storage module receiving area to secure the module adjacent the headliner.

In one aspect of the present invention, a storage module receiving panel is disposed within an opening in the headliner. The storage module receiving panel includes a top surface having a fastener securable to the headliner and a bottom surface having a securement portion. A storage module is removably attachable to the storage module receiving panel. The storage module includes a housing defining a storage area and a fastener extending from a top surface of the housing adapted to engage the securement portion on the storage module receiving panel. The storage area defined in the bottom surface of the storage module housing includes a plurality of pockets adapted to receive one or more disc media.

In another aspect of the present invention, a storage module is removably attached within a pocket formed in a lower surface of the headliner. One or more retainer clips are disposed in the pocket. The storage module includes a mounting portion having an outer surface including a mounting pin extending from the outer surface removably attachable to the retainer clip and an inner surface defining a recess which receives a storage compartment. A trim ring releasably secured to the inner surface of the mounting portion secures the storage compartment to the mounting portion. A cover portion hingedly attached to the mounting portion encloses the storage compartment between the mounting and cover portions of the storage module housing.

DETAILED DESCRIPTION OF THE PREFERRED EMBODIMENT(S)

Figure 1:
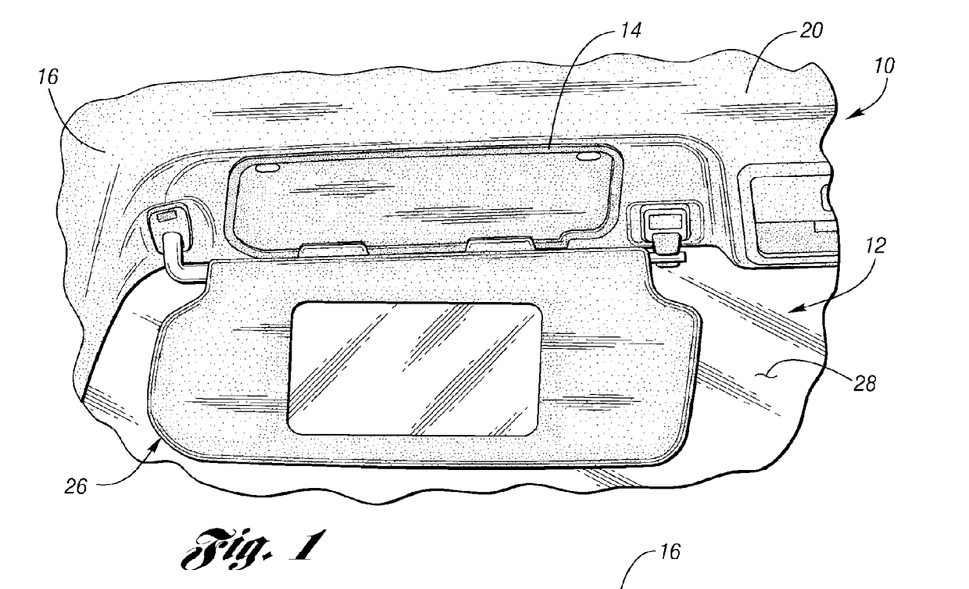
FIG. 1 is a perspective view of a passenger compartment of a vehicle incorporating a removable storage module mounted in a headliner in accordance with the present invention.

Referring now to FIG. 1, a vehicle 10 having a passenger compartment 12 includes a storage module 14 removably secured to a headliner 16. Headliner 16 comprises an upper surface 18 attached to the frame of a vehicle roof (not shown) and a lower finished surface 20 facing the passenger compartment 12.

Headliner 16 is generally formed as a one-piece structure which extends above the passenger compartment 12 of vehicle 10. Headliner 16 may have any suitable configuration and comprise any suitable materials, such as natural and/or synthetic materials. Furthermore, the headliner body may include a single or multiple layer construction. The headliner body may also include a decorative cover material or overlay, such as a polymeric material or fabric that faces passenger compartment 12.

Figure 2:
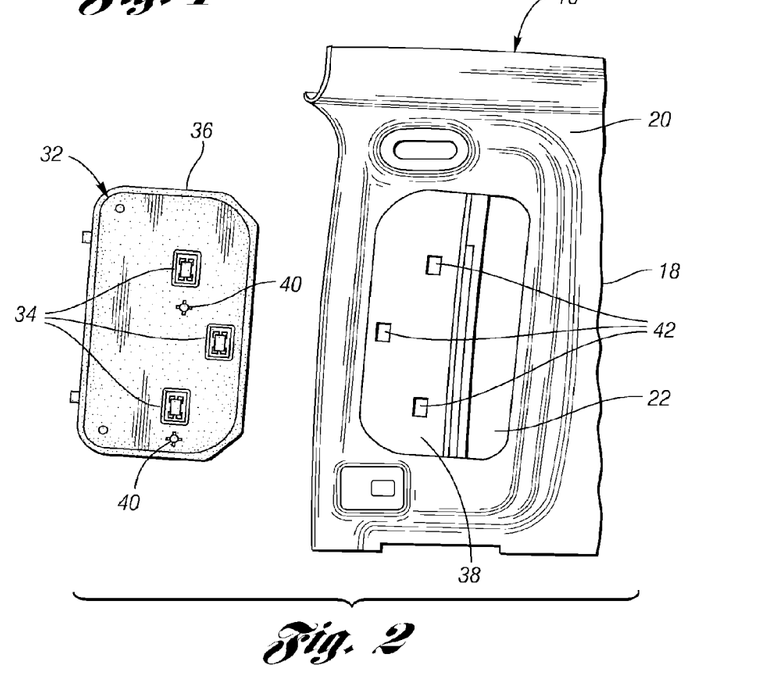
FIG. 2 is a bottom plan view of a storage module receiving panel prior to assembly in the headliner.

Referring additionally now to FIG. 2, at least one storage module receiving area is formed proximate a forward portion of headliner 16 above a pair of front passenger seats (not shown) in passenger compartment 12. Receiving area 22 is configured to receive storage module 14 when secured in headliner 16. A sun visor assembly 26 pivotally mounted to headliner 16 adjacent receiving area 22 limits glare or light entering through the windshield 28 of vehicle 10. The visor assembly 26 includes a visor body that is pivotable between a use position and a stored position illustrated in FIG. 6 in which the visor body at least partially covers the storage when the combination is mounted in the vehicle.

In one aspect of the invention shown in FIGS. 1-6, storage module receiving area 22 is a single opening formed in the headliner 16 above the driver side portion of the passenger compartment 12 of vehicle 10. A storage module receiving panel or securement portion 32 is positioned proximate receiving area 22. Panel 32 includes one or more fasteners 34 extending from a top surface 36 which secure panel 32 on or near to headliner 16. Top surface 36 of panel 32 include four way and two way locators 40 which assist in mounting panel 32 adjacent opening 22. Fasteners 34 extend through channels 42 in frame 38 to secure the bezel in position in opening 22. Alternatively, the headliner may include slots which receive fasteners extending from the panel to secure the panel in the headliner opening. It is understood that a variety of fasteners may be used, such as snaps, retainer clips, magnets, VELCRO, adhesives and the like.

Figure 3:
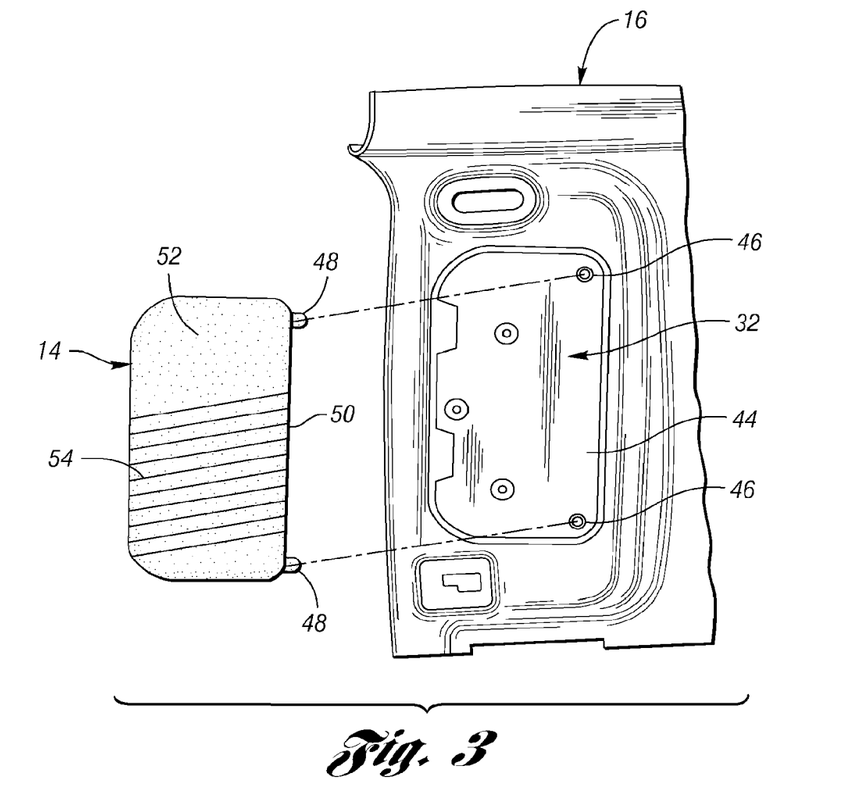
FIG. 3 is a bottom plan view of the removable storage module assembly prior to mounting on the storage module receiving panel.
Figure 4:
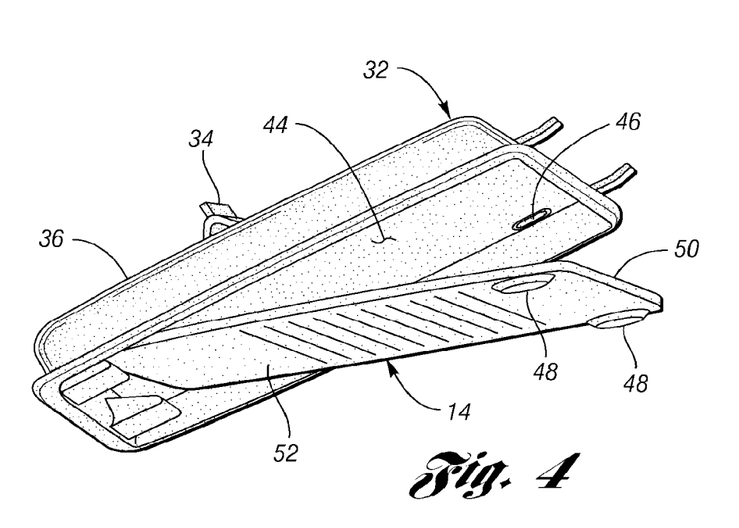
FIG. 4 is a perspective view of the removable storage module and storage module receiving panel in accordance with one aspect of the present invention.
Figure 5:
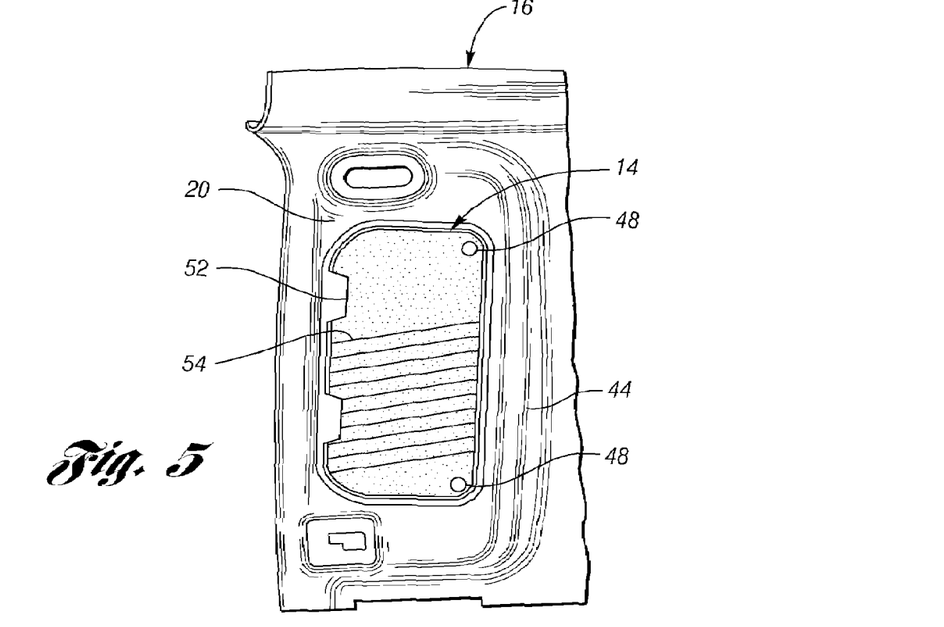
FIG. 5 is a bottom plan view of the removable storage module assembly secured to the headliner.

Referring now to FIGS. 3-5, a bottom surface 44 of storage module receiving panel 32 includes one or more receiving slots 46 configured to releasably secure storage module 14 to panel 32. Mounting arms 48 extend from a top surface 50 of storage module 14. Mounting arms extend through receiving slots 46 when storage module 14 is secured to panel 32. FIG. 5 illustrates the storage module 14 secured to panel 32 in headliner 16. Bottom surface 52 of storage module 14 is substantially flush with lower surface 20 of headliner 16. A series of pockets 54 are provided in the lower surface 52 of storage module 14 to receive items such compact discs or the like. The number and spacing of pockets 54 may be altered to accommodate a variety of shaped and sized objects.

Figure 6:
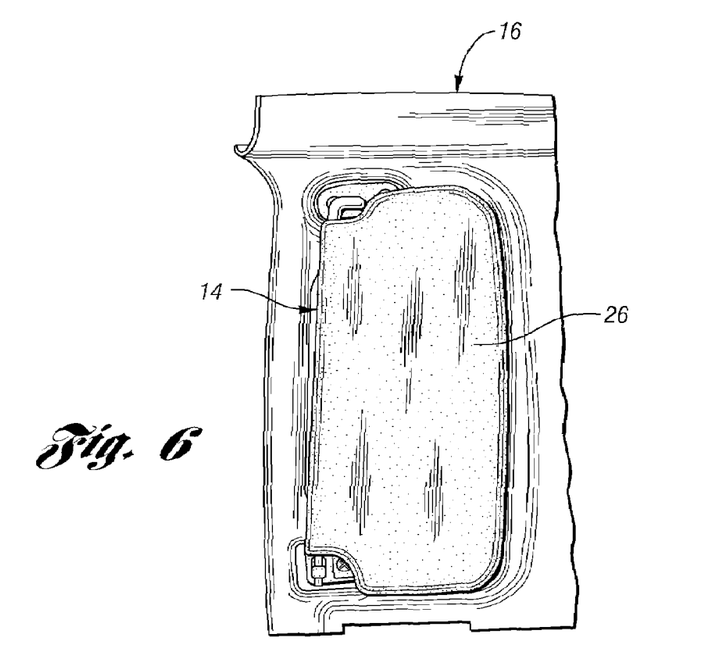
FIG. 6 is a bottom plan view of a sun visor positioned above the removable storage module assembly and headliner.

Referring now to FIG. 6, visor 26 is placed in the stored position on headliner 16 such that visor 26 extends generally horizontally over storage module 14 in headliner 16. Visor 26 conceals storage module 14 to limit exterior viewing of the contents of storage module 14 the in passenger compartment. In one aspect of the invention illustrated in FIGS. 1-6, a single storage module 14 is mounted in a single opening in headliner 16 above the driver's side portion of passenger compartment of the vehicle. However, it is understood that a plurality of storage modules may be positioned in other portions of the passenger compartment of the vehicle, such as above the front passenger seat position or any rear seat passenger position of the vehicle.

Figures 7, 8:
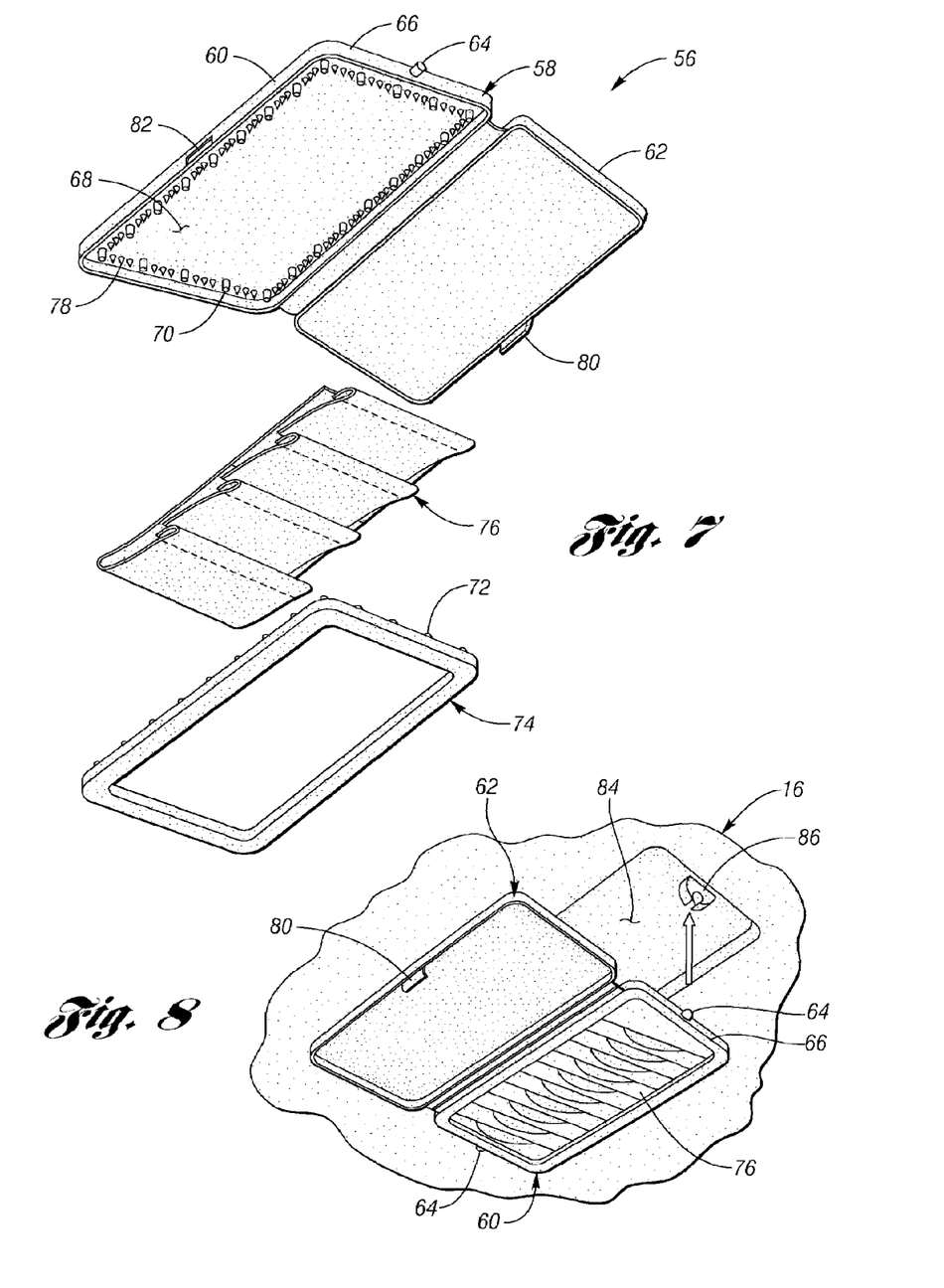
FIG. 7 is an exploded perspective view of another aspect of a removable storage module assembly in accordance with the present invention.
FIG. 8 is a perspective view of the removable storage module assembly.

Referring now to FIGS. 7 and 8, another aspect of the present invention illustrates a storage module 56 configured for releasable securement to a headliner 16 of a vehicle as disclosed. Storage module 56 includes a clam shell housing 58 having a mounting portion 60 and a cover portion 62 hingedly mounted thereto. Mounting portion 60 includes a pair of mounting pins 64 extending from opposing end walls 66 of mounting portion 60. It is understood that mounting pins 64 may extend from other surfaces of the housing based on the positioning of the storage module to headliner 16.

Inner surface 68 of mounting portion 60 includes a series of bosses 70 which cooperate with corresponding bosses 72 on trim ring 74 to secure accessory mounting sleeve 76 therebetween. A plurality of gripping teeth 78 on inner surface 68 of mounting portion 60 engage sleeve 76 to assist trim ring 74 in securing sleeve 76 within housing 58. Cover portion 62 includes a latch 80 which engages catch 82, mounting portion 60 to secure cover 62 over sleeve 76.

As is shown in FIG. 8, a pocket 84 is formed in headliner 16 and includes one or more retaining clips 86. Retaining clips 86 engage and secure mounting pins 64 on housing 58 to secure storage module 56 on headliner 16. Pocket 84 is sufficiently deep to stow storage module 56 on headliner 16 such that the outer surface of cover portion 62 is substantially flush with lower surface 20 of headliner 16, allowing a visor (not shown) to be stored flush over module 56. It is understood that fasteners such as snaps and retainer clips may be substituted for the mounting pin and retainer clip arrangement illustrated in FIGS. 7 and 8 to accomplish similar results.

Figure 9:
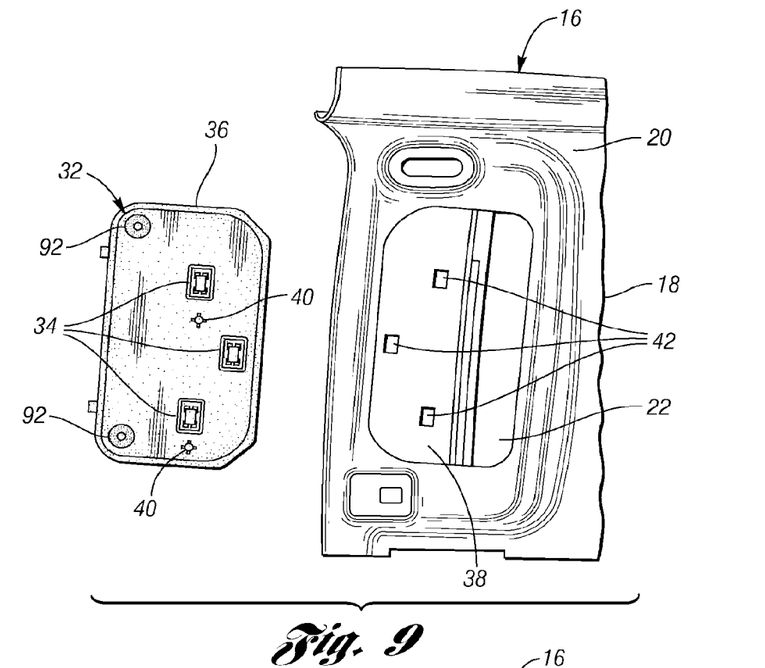
FIG. 9 is a bottom plan view of yet another aspect of the present invention illustrating a storage module receiving panel prior to assembly in the headliner.

Referring now to FIGS. 9-12, yet another aspect of the present invention illustrates a storage module 90 configured for releasable securement to a headliner 16 of a vehicle as disclosed. FIG. 9 illustrates at least one storage module receiving area is formed proximate a forward portion of headliner 16 above a pair of front passenger seats (not shown) in passenger compartment 12. Receiving area 22 is configured to receive storage module 90 when secured in headliner 16.

Storage module receiving panel or securement portion 32 is positioned proximate receiving area 22. Panel 32 includes one or more fasteners 34 extending from a top surface 36 which secure panel 32 on or near to headliner 16. The top surface 36 of panel 32 include four way and two way locators 40 which assist in mounting panel 32 adjacent opening 22. Fasteners 34 extend through channels 42 in frame 38 to secure the bezel in position in opening 22. Panel 32 further includes magnets 92 insert molded into the panel 32 configured to engage corresponding magnets 94 on the storage module 90.

Figure 10:
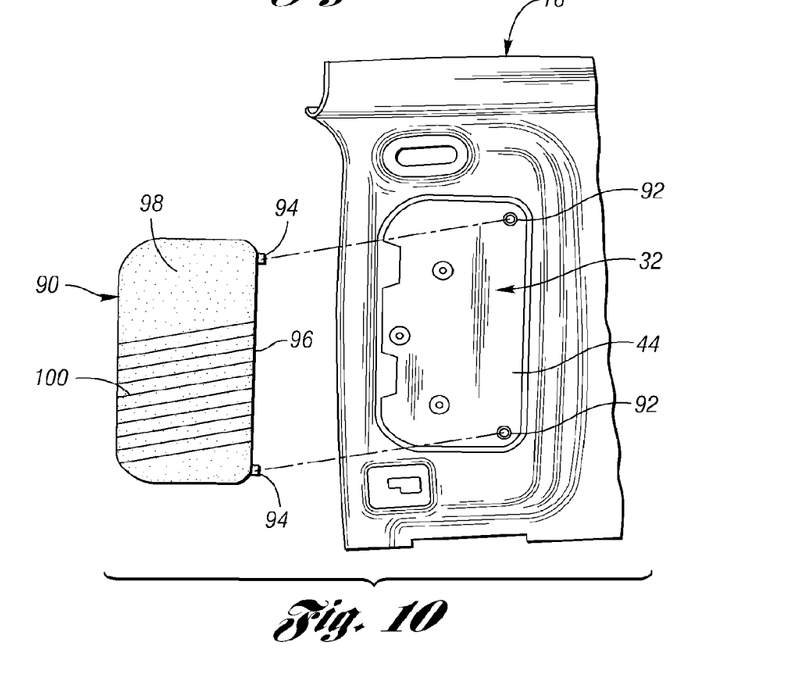
FIG. 10 is a bottom plan view of yet another aspect of the removable storage module assembly of the present invention prior to mounting on the storage module receiving panel.
Figure 11:
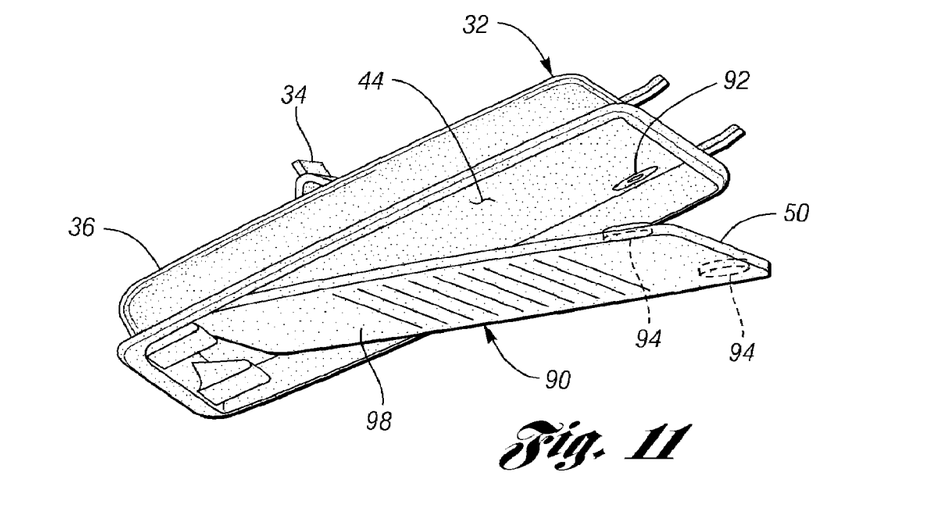
FIG. 11 is a perspective view of the removable storage module and storage module receiving panel.

Referring now to FIGS. 10-11, the bottom surface 44 of the storage module receiving panel 32 is configured to receive storage module 90 therein. In a preferred aspect of the present invention, magnets 94 are provided in a top surface 96 of storage module 90. Magnets 94 have sufficient polarity to cooperate with magnets 92 in receiving panel 32 to secure the storage module 90 to the receiving panel 32 while allowing the module 90 to be removed and transported from the vehicle. It is understood that other fastener mating pairs may also be used, such as VELCRO, snaps and the like.

Figure 12:
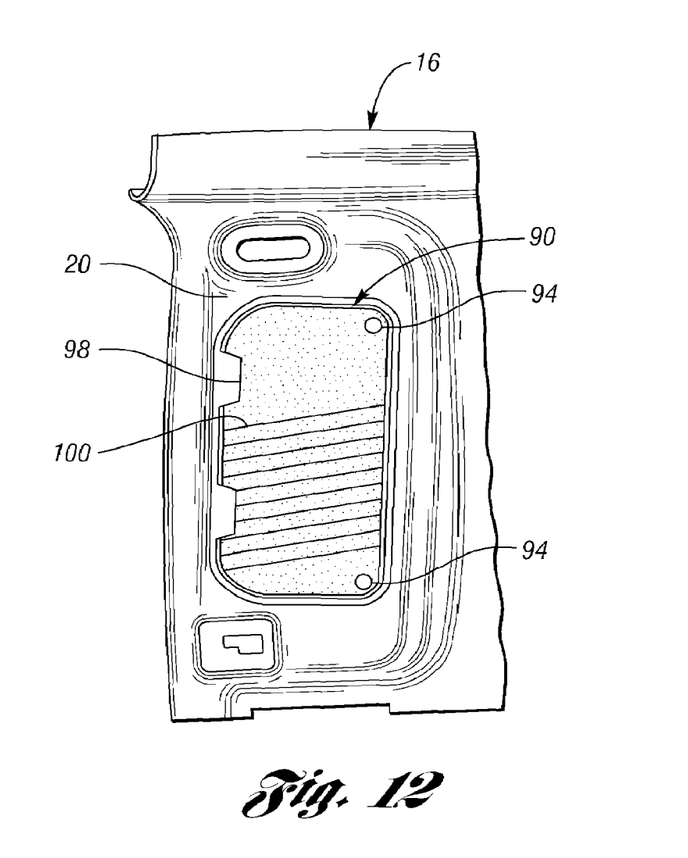
FIG. 12 is a bottom plan view of the removable storage module assembly secured to the headliner.

FIG. 12 illustrates the storage module 90 secured to panel 32 in headliner 16. The bottom surface 98 of storage module 90 is substantially flush with lower surface 20 of headliner 16. A series of pockets 100 are provided in the bottom surface 98 of the storage module 90 to receive items such as compact discs or the like. The number and spacing of pockets 100 may be altered to accommodate a variety of shaped and sized objects.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A removable storage module and headliner combination for use in a passenger compartment of a vehicle, the combination comprising:
    a headliner with a storage module receiving area formed therein;
    a storage module assembly removably positionable in the storage module receiving area, the storage module assembly having a top surface including one or more fasteners configured to engage the storage area defined in the housing and a bottom surface having a storage area defined thereon; and
    a visor assembly mountable to the headliner, the visor assembly includes a visor body that is pivotable between a use position and a stored position in which the visor body at least partially covers the storage module when the combination is mounted in the vehicle.

2. The combination of claim 1 wherein the storage module receiving area comprises an opening formed through the headliner.

3. The combination of claim 1 wherein the storage module assembly further comprises a storage module receiving panel mounted proximate the storage module receiving area having a top surface including the one or more fasteners to engage the receiving area defined in the headliner and a bottom surface having one or more magnets disposed thereon.

4. The combination of claim 3 wherein the storage module assembly further comprises a storage module having one or more magnets disposed on the top surface of the storage module adapted to engage the one or more magnets disposed on the bottom surface of the storage module receiving panel.

5. The combination of claim 1 wherein a pocket is formed in a lower surface of the storage module receiving area.

6. The combination of claim 5 wherein the storage area defined on the bottom surface of the storage module of the storage module assembly includes a plurality of pockets adapted to receive one or more disc media.

7. A removable storage module assembly for use with a vehicle having a headliner, the headliner having an opening formed through the headliner, the storage module assembly comprising:
    a storage module receiving panel disposed within the opening in the headliner, the panel having a top surface having one or more fasteners securable to the headliner and a bottom surface having a securement portion including one or more magnets disposed thereon; and
    a storage module removably attachable to the storage module receiving panel, the storage module having a bottom surface that defines a storage area and a top surface having one or more magnets disposed thereon adapted to engage the one or more magnets on the bottom surface of the securement portion on the storage module receiving panel,
    wherein the storage area defined on the bottom surface of the storage module includes a plurality of pockets adapted to receive one or more disc media.

* * * * *

UNITED STATES PATENT AND TRADEMARK OFFICE
CERTIFICATE OF CORRECTION

PATENT NO. : 7,393,046 B2  Page 1 of 1
APPLICATION NO. : 11/275384
DATED : July 1, 2008
INVENTOR(S) : Neil A. Schultz

It is certified that error appears in the above-identified patent and that said Letters Patent is hereby corrected as shown below:

Column 5, Line 12, Claim 1:
Delete "storage area" and insert -- receiving area --.

Column 5, Line 13, Claim 1:
Delete "housing" and insert -- headliner --.

Signed and Sealed this

Seventh Day of October, 2008

JON W. DUDAS
*Director of the United States Patent and Trademark Office*